(12) United States Patent
Inamine

(10) Patent No.: US 6,411,398 B1
(45) Date of Patent: Jun. 25, 2002

(54) COMPUTER INTERFACE UNIT FOR COMPUTER DATA PRINT-OUT SYSTEM USING STENCIL PRINTERS

(75) Inventor: Noboru Inamine, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/327,676

(22) Filed: Jun. 8, 1999

(30) Foreign Application Priority Data

Jun. 9, 1998 (JP) .......................................... 10-160322

(51) Int. Cl.⁷ .............................................. G06K 15/00
(52) U.S. Cl. ......................................... 358/1.2; 358/1.1
(58) Field of Search ........................... 358/1.1, 1.9, 1.2, 358/1.13, 1.6, 1.5, 445, 447, 451, 455; 710/64, 68; 347/189, 192; 711/165; 382/216, 176; 101/128.4, 484, 114, 128.21; 400/61, 76

(56) References Cited

U.S. PATENT DOCUMENTS 5,751,923 A * 5/1998 Matsuzawa .................. 345/520
5,862,305 A * 1/1999 Girmay et al. ................ 358/1.1
6,125,748 A * 10/2000 Inamine .................... 101/128.4
6,317,802 B1 * 11/2001 Inamine .................... 101/128.4

* cited by examiner

*Primary Examiner*—Arthur G. Evans
(74) *Attorney, Agent, or Firm*—Nixon Peabody LLP; Donald R. Studebaker

(57) ABSTRACT

A computer data print-out system is formed by a computer, a plurality of stencil printers and a computer interface unit connected between the computer and the stencil printers. The computer interface unit makes output data on the basis of raster image data and input resolution data representing the resolution of the raster image data which are input from the computer and outputs the output data into one of the stencil printers. The computer interface unit reads out from each of the stencil printers the output resolution data representing the output resolution at which the stencil printer can make print, selects out of the stencil printers connected to the computer interface unit a stencil printer which has an output resolution equal to the resolution of the raster image data, and outputs the output data into the selected stencil printer.

2 Claims, 9 Drawing Sheets

INPUT RESOLUTION : 300dpi
OUTPUT RESOLUTION : 600dpi

INPUT RESOLUTION : 300dpi
OUTPUT RESOLUTION : 400dpi

PRIOR ART

COMPUTER INTERFACE UNIT FOR COMPUTER DATA PRINT-OUT SYSTEM USING STENCIL PRINTERS

BACKGROUND OF THE INVENTION

1. Field of the Invention

This invention relates to a computer interface unit for a computer data print-out system using stencil printers with a stencil master making means, and more particularly to a computer interface unit which is connected between a computer such as a personal computer and a plurality of stencil printers, each provided with a stencil master making means, in a computer data print-out system.

2. Description of the Related Art

Recently, data made by a personal computer is often printed out by a printer. When printing out character data and/or image data made by a personal computer, a printer driver exclusive for a particular type of printer is installed in the personal computer. The printer driver converts the character data and the like made by the personal computer to resolution-dependent raster image data which conform to the resolution of the printer in response to print command from the application side and makes resolution-dependent print data including the raster image data and print control data. The printer driver inputs the resolution-dependent print data thus made into the printer and causes the printer to print out the data made by the personal computer.

Further, there has been known a stencil printer which reads out an image on an original to make image data and prints out a number of copies of the original on the basis of the image data. Further there has been proposed a printing system including a stencil printer which makes print according to print data output from a personal computer. Such a system will be referred to as "a computer data print-out system using a stencil printer", in this specification.

FIG. 10 shows an example of a conventional computer data print-out system using a stencil printer which carries out printing according to print data output from a personal computer. The system comprises a personal computer 1, a stencil printer 3 with a stencil master making means and a computer interface unit 2 connected between the personal computer 1 and the stencil printer 3. The computer interface unit 2 receives resolution-dependent print data from the personal computer 1, makes page print data (output data) for the stencil printer 3 on the basis of address data, raster image data, page discharge data and the like in the resolution-dependent print data, and inputs the output data into the stencil printer 3. The stencil printer 3 makes a stencil master according to the output data input from the computer interface unit 2 and outputs copies by use of the stencil master. Further it is possible to cause the stencil printer 3 to make print according to print data output from a remote personal computer 4 by effecting data transfer through modems 5a and 5b.

In the conventional system, the computer interface unit and the stencil printer are connected in one-to-one correspondence and the personal computer makes print data conforming to the resolution of the stencil printer connected to the computer interface unit with the computer interface unit generally not provided with resolution changing function. Accordingly, in a system where stencil printers of different resolutions, e.g., 300 dpi, 400 dpi and 600 dpi, are selectively connected to the computer interface unit, image information cannot be output in correct print positions and deformation of the image such as expansion and contraction of the image or image avalanche can be generated in the printed image if the resolution of the stencil printer actually connected to the computer interface unit differs from that the personal computer has expected.

Further, in the case where the personal computer can make print data only in a predetermined resolution, it is possible to arrange the computer interface unit to convert the resolution of the print data as output from the personal computer to that for a stencil printer which is expected to be connected to the computer interface unit. However also in this case, if a stencil printer of different resolution is connected to the computer interface unit, normal printing cannot be obtained.

Further when print data output from a remote personal computer which is connected to the computer interface unit through, for instance, modems, is to be printed, the operator of the personal computer cannot know the resolution of the stencil printer and it is difficult for the operator to conform the print data to the resolution of the stencil printer.

SUMMARY OF THE INVENTION

In view of the foregoing observations and description, the primary object of the present invention is to provide a computer interface unit for a computer data print-out system using stencil printers which enables the computer data print-out system to print out computer data made by the computer in a high quality free from deformation of the image such as expansion and contraction of the image or image avalanche even if the computer data is made without taking into account the output resolution of the stencil printer.

In accordance with a first aspect of the present invention, there is provided a computer interface unit for a computer data print-out system comprising a computer, a plurality of stencil printers each having a stencil master making means and a computer interface unit connected between the computer and the stencil printers, the computer interface unit being for making output data on the basis of raster image data and input resolution data representing the resolution of the raster image data which are input from the computer and outputting the output data into one of the stencil printers, said computer interface unit characterized by having a printer resolution read-out means which reads out from each of the stencil printers the output resolution data representing the output resolution at which the stencil printer can make print, and a data output means which selects out of the stencil printers connected to the computer interface unit a stencil printer which has an output resolution equal to the resolution of the raster image data on the basis of the input resolution data and the output resolution data representing the output resolution of each of the stencil printers, and outputs the output data into the selected stencil printer.

The computer interface unit of the first aspect of the present invention may deal with the case where there is no stencil printer which has an output resolution equal to the resolution of the raster image data in various manners. For example, the computer interface unit may give the alarm to the effect that there is no stencil printer which has an output resolution equal to the resolution of the raster image data, for instance, by generating alarm sound or sending a message to the computer without outputting the output data to any stencil printer.

In accordance with a second aspect of the present invention, there is provided a computer interface unit for a computer data print-out system comprising a computer, a plurality of stencil printers each having a stencil master making means and a computer interface unit connected between the computer and the stencil printers, the computer interface unit being for making output data on the basis of raster image data and input resolution data representing the resolution of the raster image data which are input from the computer and outputting the output data into one of the stencil printers, said computer interface unit characterized by having a printer resolution read-out means which reads out from each of the stencil printers the output resolution data representing the output resolution at which the stencil printer can make print, and a resolution conversion means which selects out of the stencil printers connected to the computer interface unit a stencil printer which has an output resolution conforming to the resolution of the raster image data on the basis of the input resolution data and the output resolution data representing the output resolution of each of the stencil printers, and converts the raster image data input from the computer to raster image data of resolution equal to the resolution of the selected stencil printer, an output data making means which makes output data on the basis of the converted raster image data, and a data output means which outputs the output data made by the output data making means into the selected stencil printer.

In the computer data print-out system of the present invention, a stencil printer having a stencil master making section formed integrally with a printing section is employed. The stencil master making section is provided with, for instance, a line type thermal head and perforates a stencil master material according to an image signal, thereby making a stencil master. The printing section has a printing drum around which the stencil master is wound and ink supplied inside the printing drum is transferred to a printing paper through perforations in the stencil master. In the stencil printer with such a stencil master making section, the resolution of the thermal head governs the resolution of the stencil printer.

The expression "a stencil printer which has an output resolution conforming to the resolution of the raster image data" means one of the stencil printers connected to the computer interface unit which, when makes print on the basis of the output data made by the output data making means on the basis of the converted raster image data, can output an image the highest in quality in the stencil printers connected to the computer interface unit. For example, a stencil printer whose output resolution is an integral multiple of the resolution of the input raster image data is most preferable as the "stencil printer which has an output resolution conforming to the resolution of the raster image data". When there is connected no stencil printer whose output resolution is an integral multiple of the resolution of the input raster image data, the stencil printer which is the highest in output resolution in the stencil printers connected to the computer interface unit is selected.

When a stencil printer whose output resolution is identical to the resolution of the input raster image data is connected to the computer interface unit, the stencil printer may be selected as the "stencil printer which has an output resolution conforming to the resolution of the raster image data". In this case, the resolution conversion means may input into the output data making means the input raster image data as it is without resolution conversion. However, in this specification, it should be broadly interpreted that the resolution conversion means converts the raster image data input from the computer to raster image data of resolution equal to the resolution of the selected stencil printer even if a stencil printer whose output resolution is identical to the resolution of the input raster image data is selected as the "stencil printer which has an output resolution conforming to the resolution of the raster image data" and the resolution conversion inputs into the output data making means the input raster image data as it is without resolution conversion. Further the resolution conversion means may select a stencil printer whose output resolution is an integral multiple of the resolution of the input raster image data as the "stencil printer which has an output resolution conforming to the resolution of the raster image data" even if a stencil printer whose output resolution is identical to the resolution of the input raster image data is connected to the computer interface unit.

In the computer data print-out system of the first aspect of the present invention, since a stencil printer which has an output resolution equal to the resolution of the raster image data is selected out of the stencil printers connected to the computer interface unit and the selected stencil printer makes print, high quality printing free from deformation of the image such as expansion and contraction of the image or image avalanche can be obtained.

Further in the computer data print-out system of the second aspect of the present invention, when there is connected no stencil printer whose output resolution is equal to the resolution of the raster image data, a stencil printer which has an output resolution conforming to the resolution of the raster image data is selected out of the stencil printers connected to the computer interface unit and the selected stencil printer makes print, whereby high quality printing relatively free from deformation of the image such as expansion and contraction of the image or image avalanche can be obtained.

In the case where a resolution optimal to desired printing can be selected by the computer side printer driver, printing of as high quality as possible can be obtained by simply selecting the optimal resolution by the computer side printer driver since a stencil printer which has an output resolution conforming to or equal to the optimal resolution is automatically selected and caused to make print.

DESCRIPTION OF THE PREFERRED EMBODIMENT

Figure 1:
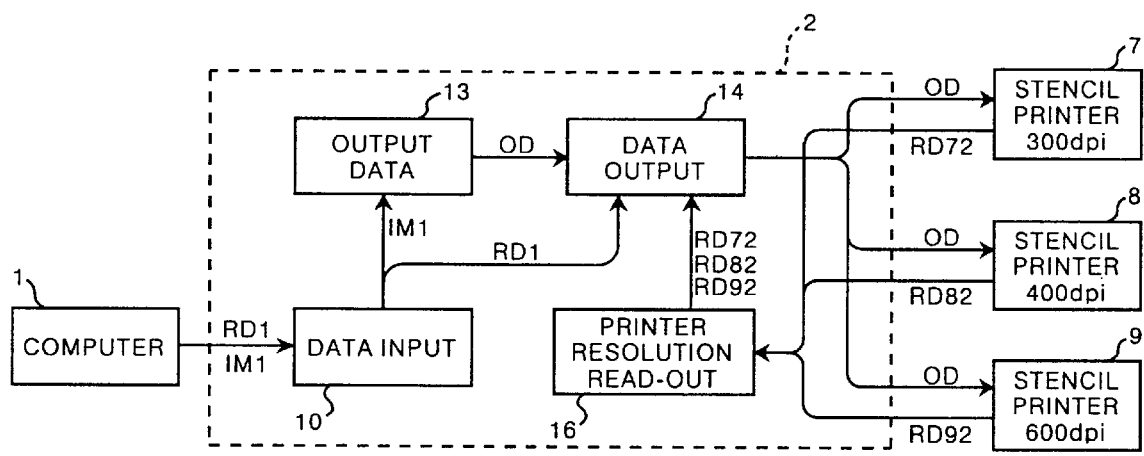
FIG. 1 is a block diagram showing a computer data print-out system employing a computer interface unit in accordance with the first aspect of the present invention.

In FIG. 1, a computer data print-out system comprises a personal computer 1, three stencil printers 7, 8 and 9 which are 300 dpi, 400 dpi and 600 dpi, respectively, in output resolution and a computer interface unit 2 which connects the stencil printers 7, 8 and 9 to the personal computer 1. Stencil printers of other output resolutions may be further connected to the computer interface unit 2.

The computer interface unit 2 comprises a data input means 10 which takes in print data consisting of raster image data IM1, address data, page discharge data, input resolution data RD1 representing the resolution of the raster image data IM1 and the like output from the computer 1, an output data making means 13 which makes page print data (output data) OD for the stencil printer on the basis of the print data but the input resolution data RD1, a printer resolution read-out means 16 which reads out output resolution data RD72, RD82 and RD92 representing the output resolutions at which the stencil printers 7, 8 and 9 can make print, and a data output means 14 which selects out of the stencil printers 7, 8 and 9 a stencil printer which has an output resolution equal to the resolution of the raster image data IM1 on the basis of the input resolution data RD1 in the print data and the output resolution data RD72, RD82 and RD92, and outputs the output data OD into the selected stencil printer.

In the computer data print-out system shown in FIG. 1, the printer resolution read-out means 16 of the computer interface unit 2 reads out output resolution data RD72, RD82 and RD92 from the stencil printers 7, 8 and 9 and stores them in a memory means not shown.

A printer driver for a printer having a predetermined resolution has been installed in the personal computer 1. The personal computer 1 converts character data, image data and the like made by an application to raster image data IM1 at a resolution conforming to the output resolution determined by the printer driver, and makes print control data such as address data, page discharge data and the like which are required when the computer interface unit 2 makes the output data OD, and outputs print data consisting of the raster image data IM1, the print control data and the input resolution data RD1 to the computer interface unit 2.

The data input means 10 of the computer interface unit 2 takes in the print data made by the personal computer 1 and inputs the print data but the input resolution data RD1 into the output data making means 13. At the same time, the data input means 10 inputs the input resolution data RD1 into the data output means 14. The output data making means 13 makes output data OD on the basis of the print data and inputs the output data OD into the data output means 14. The data output means 14 reads out the output resolution data RD72, RD82 and RD92 from the memory and selects out of the stencil printers 7, 8 and 9 a stencil printer which has an output resolution equal to the input resolution data RD1. Then the data output means 14 outputs the output data OD into the selected stencil printer and sets printing parameters such as the number of copies to be printed, the printing speed and the like for only the selected printer. The selected stencil printer makes a stencil master on the basis of the output data OD and makes print using the stencil master.

Thus in this computer data print-out system, since a stencil printer which has an output resolution equal to the resolution of the input resolution data RD1 is selected out of the stencil printers 7, 8 and 9 connected to the computer interface unit 2 and the selected stencil printer makes print according to the output data OD, high quality printing free from deformation of the image such as expansion and contraction of the image or image avalanche can be obtained irrespective of the resolution of the raster image data IM1 made by the computer 1.

Figure 2:
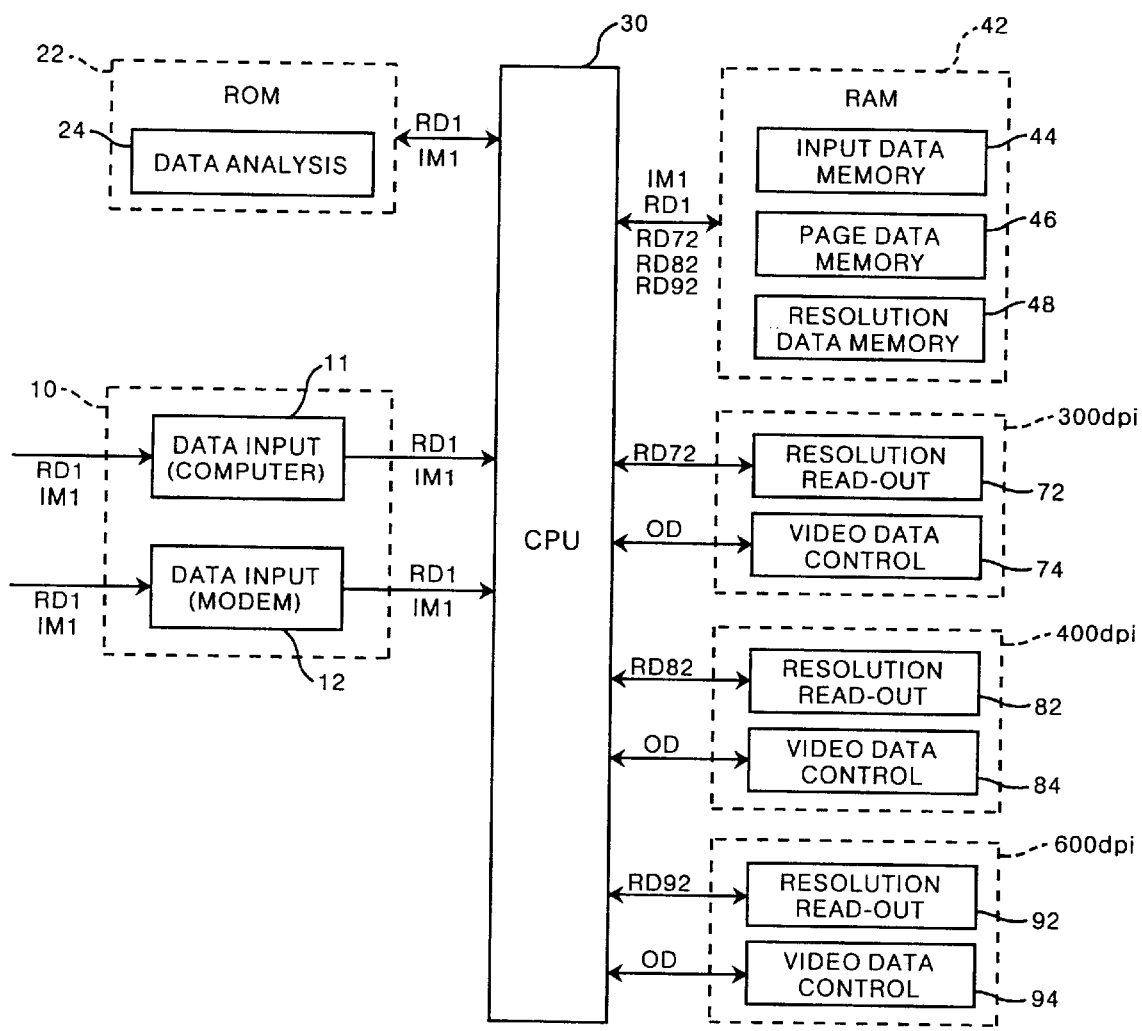
FIG. 2 is a block diagram showing an embodiment of the computer interface unit in the computer data print-out system shown in FIG. 1.

FIG. 2 shows a concrete example of the computer interface unit 2 which can be employed in the computer data print-out system shown in FIG. 1. As shown in FIG. 2, the computer interface unit 2 comprises a data input means 11 which is connected to the personal computer 1 and takes in the print data output from the personal computer 1, and a CPU 30 which variously processes the print data taken in by the data input means 11 and makes the output data OD. Further the computer interface unit 2 may be provided with a data input means 12 which takes in print data input from a remote personal computer through a modem.

A RAM 42 including an input data memory 44, a page data memory 46 and a resolution data memory 48, a ROM 22 including a data analysis means 24, a resolution read-out means 72 which reads out the output resolution data RD72 representing the output resolution of the stencil printer 7, a resolution read-out means 82 which reads out the output resolution data RD82 representing the output resolution of the stencil printer 8, and a resolution read-out means 92 which reads out the output resolution data RD92 representing the output resolution of the stencil printer 9 are connected to the CPU 30. A video data control means 74, 84 and 94 which output the output data OD to the selected stencil printer are further connected to the CPU 30. The computer interface unit 2 connects the resolution read-out means 72 and the video data control means 74 to the stencil printer 7 (300 dpi) shown in FIG. 1, the resolution read-out means 82 and the video data control means 84 to the stencil printer 8 (400 dpi) and the resolution read-out means 92 and the video data control means 94 to the stencil printer 9 (600 dpi).

The CPU 30, the RAM 42 and the ROM 22 form the output data making means 13 shown in FIG. 1. The resolution read-out means 72, 82 and 92 form the printer resolution read-out means 16 shown in FIG. 1 and the video data control means 74, 84 and 94 form the data output means 14 shown in FIG. 1.

The operation of the computer interface unit 2 shown in FIG. 2 will be described with reference to the flow chart shown in FIG. 3, hereinbelow.

The computer interface unit 2 obtains, prior to processing the print data input from the personal computer 1, the output resolution data RD72, RD82 and RD92 output from the respective stencil printers 7, 8 and 9 by way of the resolution read-out means 72, 82 and 92 and stores them in the resolution data memory 48. (step ST10)

Then the CPU 30 takes in print data sent from the personal computer 1 through the data input means 11 and stores the print data in the input data memory in the RAM 42. (step ST20)

The print data output from the personal computer 1 consists of raster image data IM1 representing the image to be printed, address data representing the printing position on each page, page discharge data for parting pages from each other, input resolution data representing the resolution of the raster image data IM1 and the like. The CPU 30 reads out the print data from the input data memory 44, causes the data analysis means 24 to analyze the print data, and divides the print data into raster image data IM1, address data, page discharge data, input resolution data RD1 and the like. (step ST30) Then the input resolution data RD1 is stored in the resolution data memory 48. (steps ST40 and 50) Otherwise, it is determined whether the CPU 30 has received video output request command. (steps ST40 and 60)

When it is determined that the CPU 30 has received video output request command, the CPU 30 reads out the raster image data IM1 from the input data memory 44, outputs the raster image data IM1 to the page data memory 46 referring to the address data and temporarily stores the same in the page data memory 46. (step ST62) The raster image data IM1 stored in the page data memory 46 forms page print data (output data) OD. When the CPU 30 receives video output request command after the page discharge data is divided by the data analysis means 24, the CPU 30 reads out the output resolution data RD72, RD82 and RD92 together with the input resolution data RD1 from the resolution data memory 48 and selects out of the stencil printers 7, 8 and 9 a stencil printer which has an output resolution equal to the input resolution data RD1. (step ST70) Then the CPU 30 sets various parameters for the selected stencil printer such as the number of the printings, the printing rate and the like (step ST72), reads out the output data OD from the page data memory 46 and inputs the output data OD to the selected stencil printer by way of the video data control means corresponding to the selected stencil printer (step ST74).

Thus the computer interface unit 2 of this embodiment selects a stencil printer which has an output resolution equal to the resolution of the input resolution data RD1 in the print data sent from the personal computer 1 out of the stencil printers 7, 8 and 9 connected to the computer interface unit 2 and outputs the output data OD to the selected stencil printer. Accordingly high quality printing free from deformation of the image such as expansion and contraction of the image or image avalanche can be obtained irrespective of the resolution RD1 of the raster image data IM1 made by the computer 1.

Figure 4:
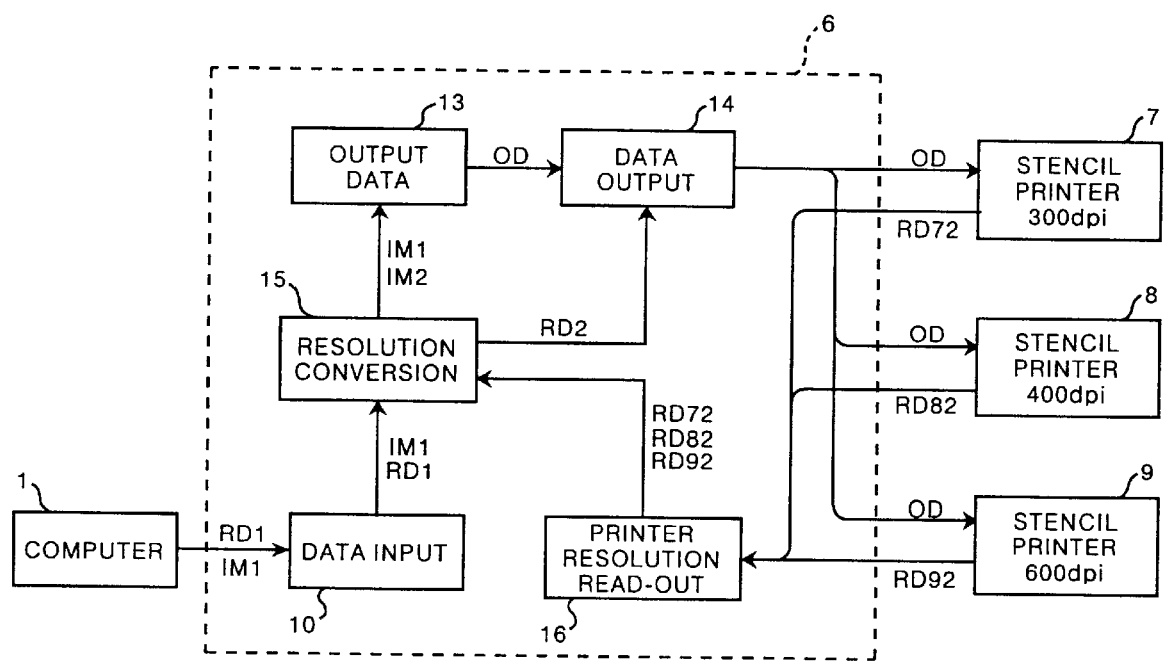
FIG. 4 is a block diagram showing a computer data print-out system employing a computer interface unit in accordance with the second aspect of the present invention.

FIG. 4 shows a computer data print-out system employing a computer interface unit 6 in accordance with the second aspect of the present invention. The computer interface unit 6 in this computer data print-out system differs from that in the computer data print-out system shown in FIG. 1 in that it is provided with resolution conversion function. That is, the computer data print-out system shown in FIG. 4 is the same as that shown in FIG. 1 except that a resolution conversion means 15 intervenes between the data input means 10 and the output data making means 13, and the raster image data IM1 and the input resolution data RD1 are input into the resolution conversion means 15 from the data input means 10 and the output resolutions data RD72, RD82 and RD92 are input into the resolution conversion means 15 from the printer resolution read-out means 16. Further printer information RD2 representing the selected stencil printer is input into the data output means 14. The other part of the system is the same as that shown in FIG. 1.

In this computer interface unit 6, the data input means 10 of the computer interface unit 2 takes in the print data consisting of the raster image data IM1, the input resolution data RD1 and the like made by the personal computer 1 and inputs the print data into the resolution conversion means 15. The output resolution data RD72, RD82 and RD92 read out by the printer resolution read-out means 16 ere also input into the resolution conversion means 15. The resolution conversion means 15 determines whether there is connected to the computer interface unit 6 a stencil printer which has an output resolution equal to the resolution of the raster image data IM1 on the basis of the output resolution data RD72, RD82 and RD92 and the input resolution data RD1. When the resolution conversion means 15 determines one of the stencil printers 7, 8 and 9 has an output resolution equal to the resolution of the raster image data IM1, the resolution conversion means 15 outputs information RD2 representing the stencil printer which has an output resolution equal to the resolution of the raster image data IM1 to the data output means 14 and inputs the input print data to the output data making means 13 as it is. On the other hand, when the resolution conversion means 15 determines none of the stencil printers 7, 8 and 9 has an output resolution equal to the resolution of the raster image data IM1, the resolution conversion means 15 selects one of the stencil printers 7, 8 and 9 which, when makes print on the basis of the output data OD made by the output data making means 13 on the basis of the converted raster image data IM2 (to be described later), can output an image the highest in quality in the stencil printers 7, 8 and 9, and inputs information RD2 representing the selected stencil printer into the data output means 14. At the same time, the resolution conversion means 15 converts the input raster image data IM1 to raster image data IM2 of resolution equal to the resolution of the selected stencil printer and inputs the converted raster image data IM2 and the input print data but the raster image data IM1 to the output data making means 13.

The output data making means 13 makes output data OD on the basis of the raster image data IM1 or IM2 input from the data input means 10 and inputs the output data OD into the data output means 14. Then the data output means 14 outputs the output data OD into the selected stencil printer on the basis of the information RD2 and sets printing parameters such as the number of copies to be printed, the printing speed and the like for only the selected printer. The selected stencil printer makes a stencil master on the basis of the output data OD and makes print using the stencil master.

Thus in this computer data print-out system, since when none of the stencil printers 7, 8 and 9 connected to the computer interface unit 6 has output resolution equal to the resolution of the raster image data IM1, one of the stencil printers 7, 8 and 9 which, when makes print on the basis of the output data OD made by the output data making means 13 on the basis of the converted raster image data IM2, which is obtained by converting the raster image data IM1 to raster image data of resolution equal to the resolution of the selected stencil printer as will be described later, can output an image the highest in quality in the stencil printers 7, 8 and 9 is selected and the output data OD made on the basis of the converted raster image data IM2 is input into the selected stencil printer, high quality printing as free as possible from deformation of the image such as expansion and contraction of the image or image avalanche can be obtained.

Figure 5:
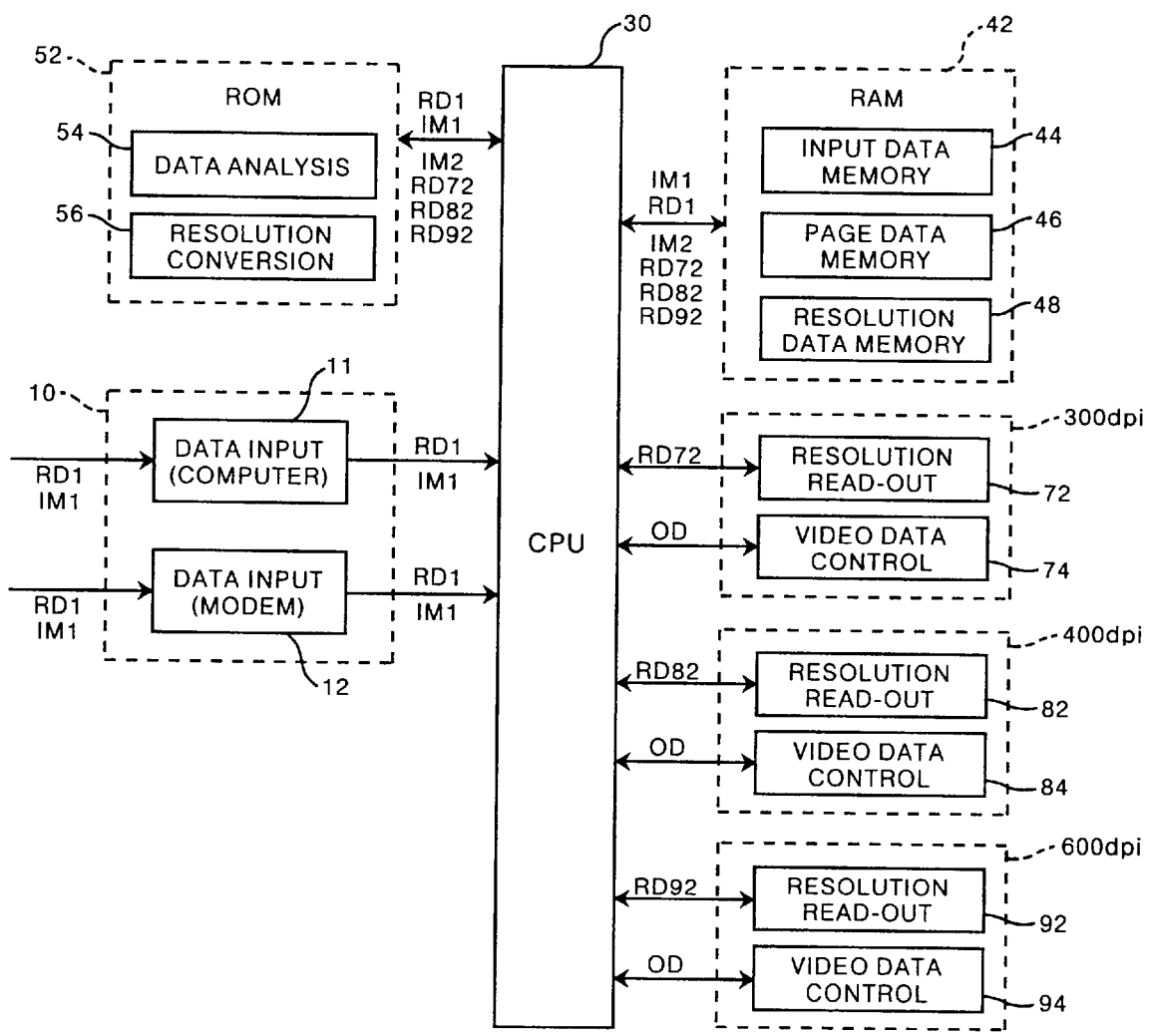
FIG. 5 is a block diagram showing an embodiment of the computer interface unit in the computer data print-out system shown in FIG. 4.

FIG. 5 shows a concrete example of the computer interface unit 6 which can be employed in the computer data print-out system shown in FIG. 4. The computer interface unit 6 shown in FIG. 5 is the same as that shown in FIG. 2 except that the ROM 52 is provided with a resolution conversion means 56 in addition to a data analysis means 54.

The operation of the computer interface unit 6 shown in FIG. 5 will be described with reference to the flow chart shown in FIG. 6, hereinbelow.

Figure 3:
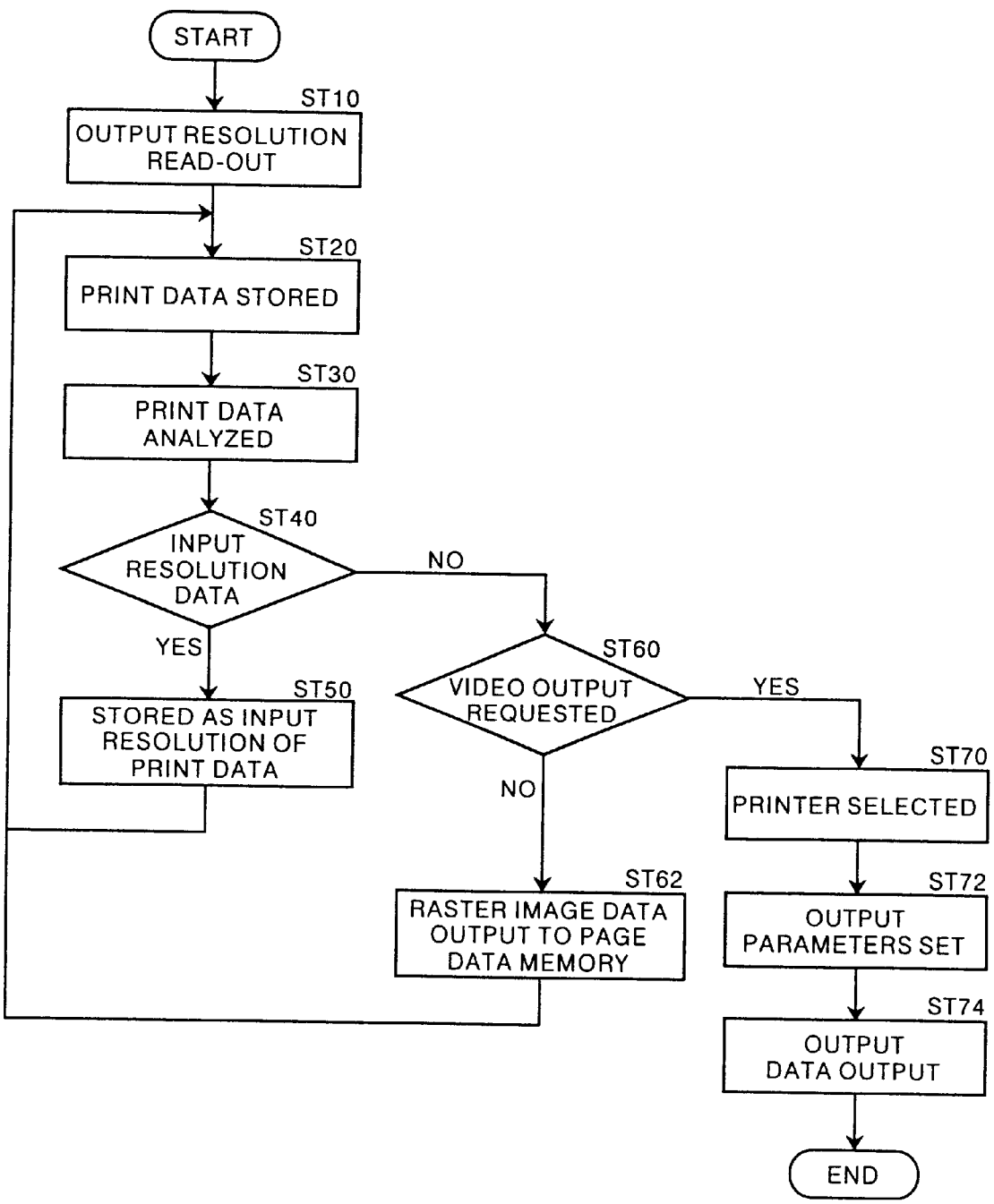
FIG. 3 is a flow chart for illustrating the operation of the computer interface unit employed in the system shown in FIG. 1.
Figure 6:
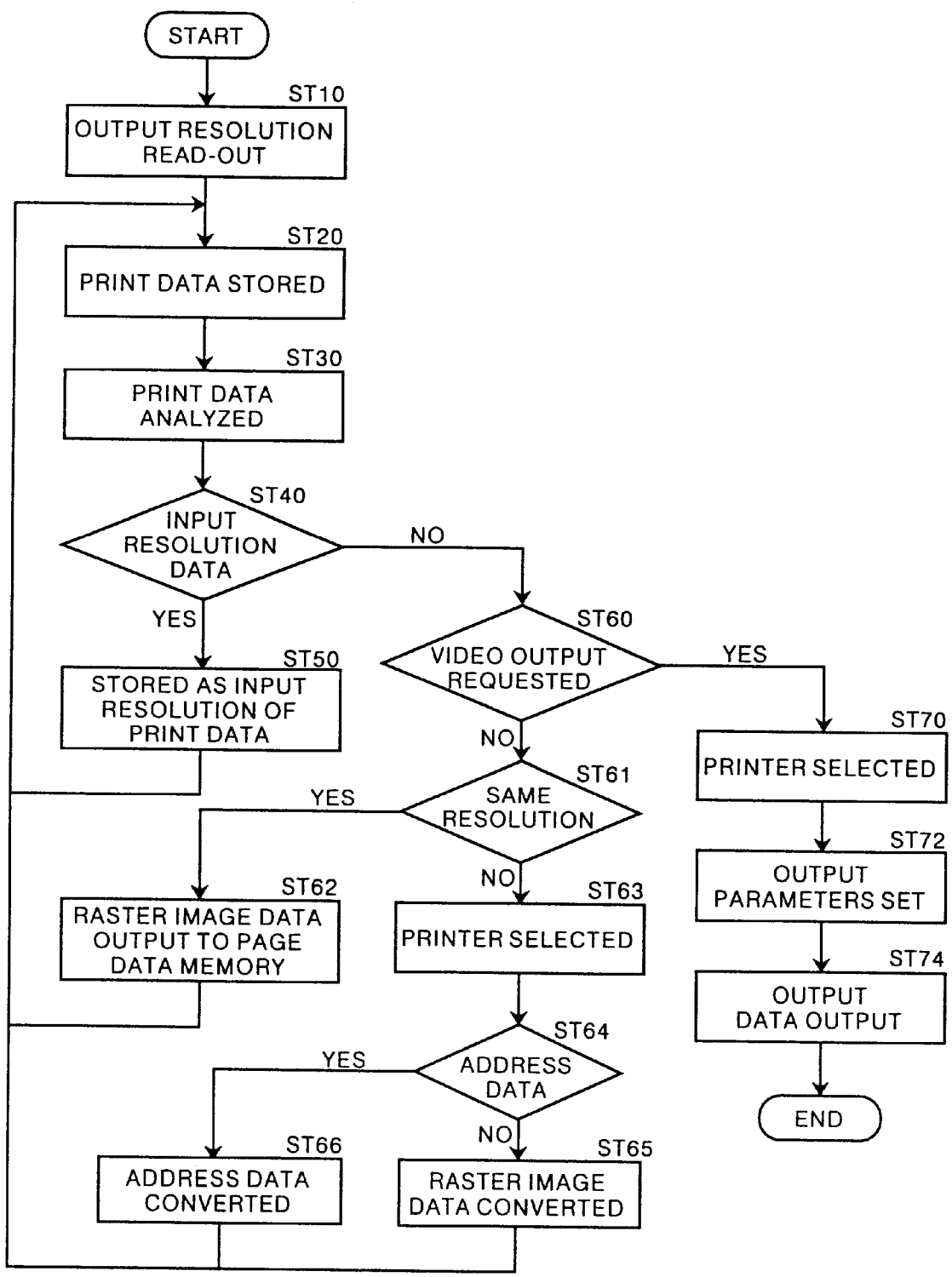
FIG. 6 is a flow chart for illustrating the operation of the computer interface unit employed in the system shown in FIG. 4.

The flow chart shown in FIG. 6 is substantially the same as that shown in FIG. 3 except that it is determined in step ST61 whether there is connected to the computer interface unit 6 a stencil printer which has an output resolution equal to the resolution of the raster image data IM1 after step ST60, and when it is determined that there is connected no stencil printer which has an output resolution equal to the resolution of the raster image data IM1, resolution conversion processing is executed in steps ST63 to 66.

When it is determined in step ST61 that there is connected no stencil printer which has an output resolution equal to the resolution of the raster image data IM1, a stencil printer which can output an image the highest in quality in the stencil printers 7, 8 and 9 when making print on the basis of the output data OD made by the output data making means 13 on the basis of the converted raster image data IM2 is selected on the basis of the input resolution data RD1 and the output resolution data RD72, RD82 and RD92. At this time, a stencil printer whose output resolution is an integral multiple of the resolution of the input raster image data IM1 is preferentially selected, and when there is connected no stencil printer whose output resolution is an integral multiple of the resolution of the input raster image data IM1, the stencil printer which is the highest in output resolution in the stencil printers 7, 8 and 9 is selected.

After the stencil printer is selected, the resolution of the input address data is converted to that of the selected stencil printer and the printing positions (output addresses) to the page data memory 46 are indexed. (steps ST64 and 66) As for the data other than the address data, the resolution of the input raster image data IM1 is converted to converted raster image data IM2 which has resolution equal to that of the selected stencil printer, and the converted raster image data IM2 is temporarily stored in the page data memory 46. (steps ST64 and 65)

The operation of the resolution conversion means 56 will be described, hereinbelow.

Description will be first made on the case where a 400 dpi stencil printer, a 600 dpi stencil printer and an 800 dpi stencil printer are connected to the computer interface unit 6 and the resolution of the raster image data IM1 (input resolution) is 300 dpi.

Figure 7:
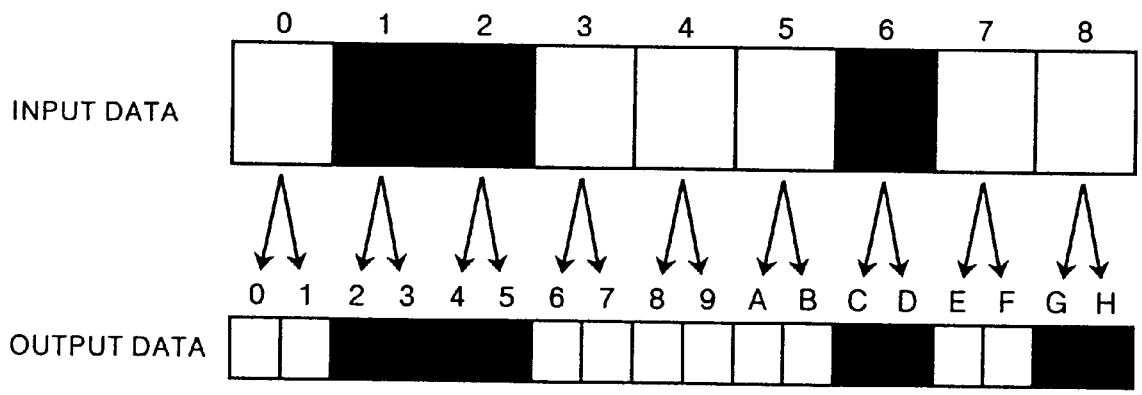
FIG. 7 is a view showing a method of converting low resolution image data to image data of higher resolution which is an integral multiple of the low resolution.

In this case, the resolution conversion means 56 selects the stencil printer 9 whose output resolution is twice the input resolution 300 dpi. In this case, since the input resolution is lower than the output resolution, conversion from low resolution to high resolution is necessary. For this purpose, the address data stored in the input data memory 44 is read out and the output positions to the page data memory 46 (output addresses) are indexed in sequence from address 0. At this time, by allocating a pair of contiguous output addresses for each input address at a suitable input address cycle, the low resolution data can be converted to solid high resolution data without vacant address. Specifically, as shown in FIG. 7, address conversion is carried out so that a pair of contiguous output addresses are allocated for each input address, e.g., output addresses 0 and 1 are allocated for input address 0, output addresses 2 and 3 are allocated for input address 1, and so on. Then the value of the raster image data IM1 at the input address corresponding to each output address is taken as the value of the converted raster image data IM2 at the output address.

Next description will be made on the case where a 200 dpi stencil printer and an 400 dpi stencil printer are connected to the computer interface unit 6 and the resolution of the raster image data IM1 (input resolution) is 300 dpi.

In this case, the resolution conversion means 56 selects the stencil printer of higher resolution (400 dpi).

Figure 8:
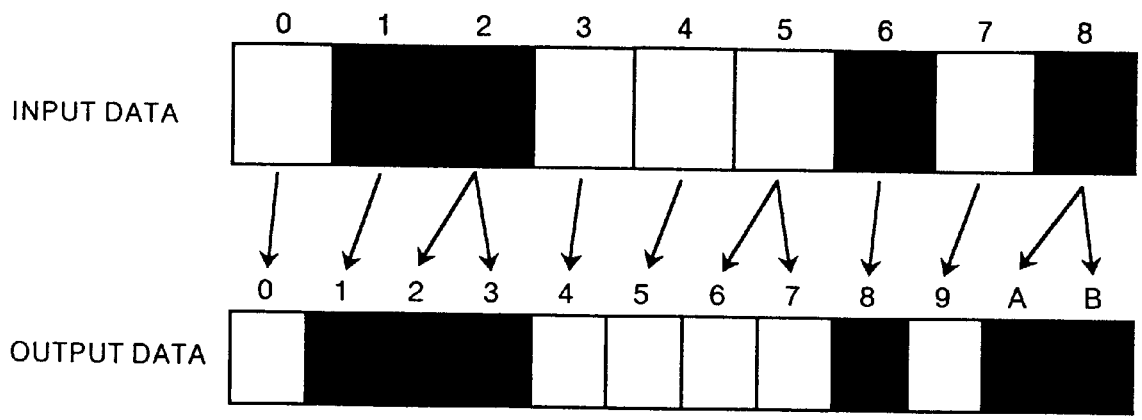
FIG. 8 is a view showing a method of converting low resolution image data to image data of higher resolution which is not an integral multiple of the low resolution.

Also in this case, since the input resolution is lower than the output resolution, conversion from low resolution to high resolution is necessary. For this purpose, the address data stored in the input data memory 44 is read out and the output positions to the page data memory 46 (output addresses) are indexed in sequence from address 0. At this time, one output address is basically allocated for each input address and a pair of contiguous output addresses are allocated for every third input address. For example, as shown in FIG. 8, output addresses 0 and 1 are allocated respectively for input addresses 0 and 1, output addresses 2 and 3 are allocated for input address 2, output addresses 4 and 5 are allocated respectively for input addresses 3 and 4, output addresses 6 and 7 are allocated for input address 5, and so on. Then the value of the raster image data IM1 at the input address corresponding to each output address is taken as the value of the converted raster image data IM2 at the output address.

Next description will be made on the case where a 200 dpi stencil printer and an 300 dpi stencil printer are connected to the computer interface unit 6 and the resolution of the raster image data IM1 (input resolution) is 400 dpi.

In this case, the resolution conversion means 56 selects the stencil printer of higher resolution (300 dpi).

Figure 9:
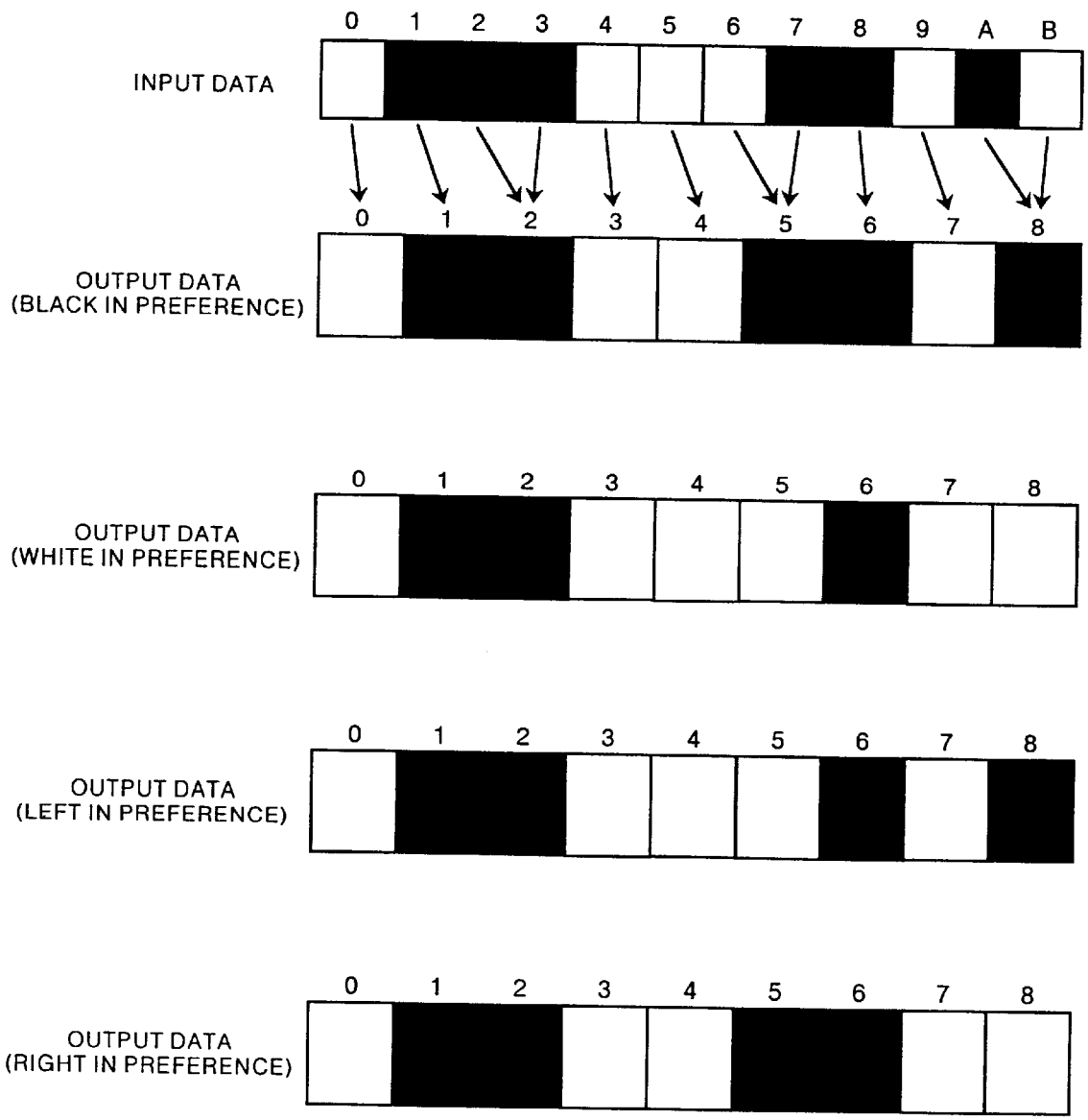
FIG. 9 is a view showing a method of converting high resolution image data to low resolution image data.
Figure 10:
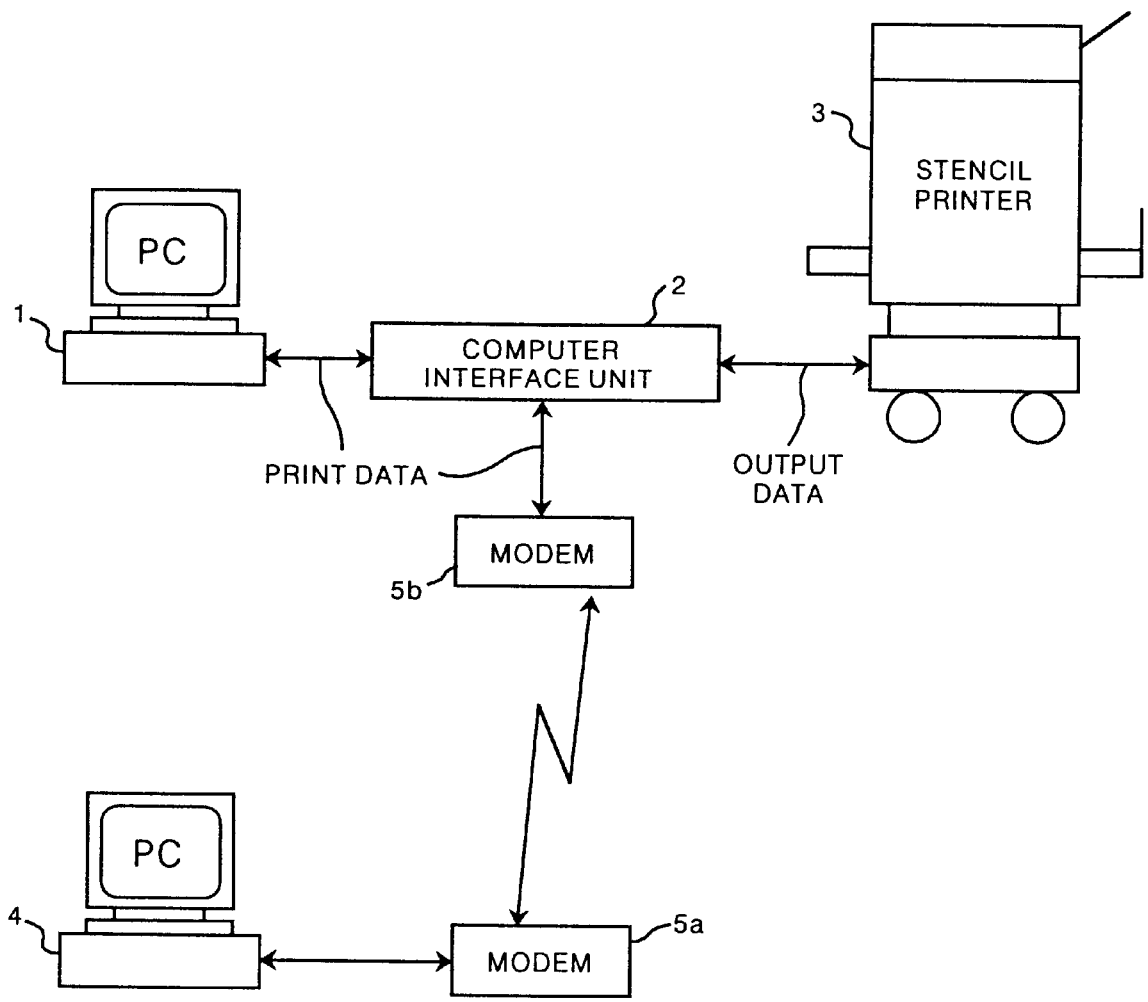
FIG. 10 is a schematic view showing a conventional computer data print-out system.

In this case, since the input resolution is higher than the output resolution, conversion from high resolution to low resolution is necessary. The address data stored in the input data memory 44 is read out and the output positions to the page data memory 46 (output addresses) are indexed in sequence from address 0. At this time, by basically allocating one output address for each input address and allocating one output address for one of every third input address and every fourth input address at a suitable input address cycle, dots can be properly thinned without overlap of data. For example, as shown in FIG. 9, output addresses 0 and 1 are allocated respectively for input addresses 0 and 1, output address 2 is allocated for one of input addresses 2 and 3, output addresses 3 and 4 are allocated respectively for input addresses 4 and 5, output addresses 5 is allocated for one of input addresses 6 and 7, and so on. Then the value of the raster image data IM1 at the input address corresponding to each output address is taken as the value of the converted raster image data IM2 at the output address.

Which one of two contiguous input addresses is to be taken may be selected from the following four methods.

In all the following methods, when the values of the raster image IM1 at the input addresses are both black, black is taken as the value of the converted raster image data IM2 at the output address allocated for the input addresses and when the values of the raster image at the input addresses are both white, white is taken as the value of the converted raster image data IM2 at the output address allocated for the input addresses. Then, when the value of the raster image data IM1 at one of the input addresses is black and that at the other input address is white, 1) black is taken as the value of the converted raster image data IM2 at the output address allocated for the input addresses (preference is given to black),
2) white is taken (preference is given to white),
3) black is taken when the left address is black and white is taken when the left address is white (preference is given to the left), and
4) black is taken when the right address is black and white is taken when the right address is white (preference is given to the right).

The method of thinning the dots may be selected according to user's preference, may be set in advance by system default so as to be changeable by the user, or may be automatically selected according to the image to be handled.

In the above description, the address data stored in the input data memory 44 is read out in sequence and the output addresses to the page data memory 46 are indexed in sequence from address 0. However when output addresses corresponding to input addresses are obtained through a calculation, the converted raster image data IM2 can be made starting from a desired input address. For example, output addresses corresponding to input addresses may be obtained according to the following formula (1).

$$\text{output address} = (\text{input address} \times \text{output resolution})/(\text{input resolution}) \quad (1)$$

However, the division in formula (1) sometimes produces a remainder, which causes gaps in the dots or overlap of output addresses. Accordingly, the gaps or overlap of output addresses must be dealt with. For example, they may be dealt with by use of a reference table (to be described hereinbelow) which shows correction values for remainders obtained by the division in formula (1). The following reference table shows correction values for remainders obtained by the division in formula (1) when print data at input resolutions of 300 dpi, 400 dpi and 600 dpi are to be converted to print data at output resolutions of 300 dpi, 400 dpi and 600 dpi.

|         | input   |         |         |
|---------|---------|---------|---------|
| output  | 300 dpi | 400 dpi | 600 dpi |
| 300 dpi | 0       | 0/0/1   | 1       |
| 400 dpi | 0/0/1/1 | 0       | 0/1     |
| 600 dpi | 0/0     | 0/0/1   | 0       |

The correction values in each cell are a correction value when the remainder is 0/that when the remainder is 1/that when the remainder is 2/that when the remainder is n (n stands for a positive integer which depends on the input and output resolutions and can be 1, 2, or 3 in this particular example) from the left to the right. When (output resolution/input resolution) is smaller than 1, an output address equal to the quotient plus the correction value is allocated for each input address, and when (output resolution/input resolution) is larger than 1, an output address equal to the quotient and an output address equal to the quotient plus the correction value are allocated for each input address.

In practice, since image data spreads in both X and Y directions, the correction must be carried out for each direction.

When data conversion from a low resolution to a high resolution is necessary, the correction is carried out in the following manner. For example, data conversion from 300 dpi to 400 dpi is necessary and a given input address is (99, 250), the output address $(X_{01}, Y_{01})$ is as follows. $X_{01}=99 \times 400/300=132$ with remainder 0 (correction value=0) $Y_{01}=250 \times 400/300=333$ with remainder 1 (correction value=0) Accordingly, an output address (132, 333) is allocated for input address (99, 250), and the value of the input raster image data IM1 at (99, 250) is output as the value of the converted raster image data IM2 at (132, 333).

Similarly, when a given input address is (134, 251), the output address $(X_{02}, Y_{02})$ is as follows. $X_{02}=134 \times 400/300=178$ with remainder 2 (correction value=1) $Y_{02}=251 \times 400/300=334$ with remainder 2 (correction value=1) Accordingly, four output addresses (178, 334), (179, 334), (178, 335) and (178, 335) are allocated for input address (134, 251), and the value of the input raster image data IM1 at (99, 250) is output as the value of the converted raster image data IM2 at each of the addresses.

When data conversion from a high resolution to a low resolution is necessary, the correction is carried out in the following manner. For example, data conversion from 400 dpi to 300 dpi is necessary and a given input address is (402, 223), the output address $(X_{03}, Y_{03})$ is as follows. $X_{03}=402 \times 300/400=301$ with remainder 2 (correction value=1) $Y_{03}=223 \times 300/400=167$ with remainder 1 (correction value=0) Accordingly, an output address (302, 167) is allocated for input address (402, 223).

Then when input address (403, 223) is given, the output address $(X_{04}, Y_{04})$ is as follows. $X_{04}=403 \times 300/400=302$ with remainder 1 (correction value=0) $Y_{04}=223 \times 300/400=167$ with remainder 1 (correction value=0) Accordingly, the same output address (302, 167) is allocated for input address (403, 223). In this case, one of the dots is removed, thereby thinning the dots.

The resolution of the input raster image data IM1 may also be converted in various ways other than those described above.

What is claimed is:

1. A computer interface unit for a computer data print-out system comprising a computer, a plurality of stencil printers each having a stencil master making means and a computer interface unit connected between the computer and the stencil printers, the computer interface unit being for making output data on the basis of raster image data and input resolution data representing the resolution of the raster image data which are input from the computer and outputting the output data into one of the stencil printers, said computer interface unit characterized by having a printer resolution read-out means which reads out from each of the stencil printers the output resolution data representing the output resolution at which the stencil printer can make print, and a data output means which selects out of the stencil printers connected to the computer interface unit a stencil printer which has an output resolution equal to the resolution of the raster image data on the basis of the input resolution data and the output resolution data representing the output resolution of each of the stencil printers, and outputs the output data into the selected stencil printer.

2. A computer interface unit for a computer data print-out system comprising a computer, a plurality of stencil printers each having a stencil master making means and a computer interface unit connected between the computer and the stencil printers, the computer interface unit being for making output data on the basis of raster image data and input resolution data representing the resolution of the raster image data which are input from the computer and outputting the output data into one of the stencil printers, said computer interface unit characterized by having a printer resolution read-out means which reads out from each of the stencil printers the output resolution data representing the output resolution at which the stencil printer can make print, and a resolution conversion means which selects out of the stencil printers connected to the computer interface unit a stencil printer which has an output resolution conforming to the resolution of the raster image data on the basis of the input resolution data and the output resolution data representing the output resolution of each of the stencil printers, and converts the raster image data input from the computer to raster image data of resolution equal to the resolution of the selected stencil printer, an output data making means which makes output data on the basis of the converted raster image data, and a data output means which outputs the output data made by the output data making means into the selected stencil printer.

* * * * *